Jan. 21, 1964  C. S. COCKERELL  3,118,513
GROUND EFFECT VEHICLE WITH INTEGRATED DIRECTIONAL
AND PROPULSIVE THRUST MEANS
Filed March 28, 1961  2 Sheets-Sheet 1
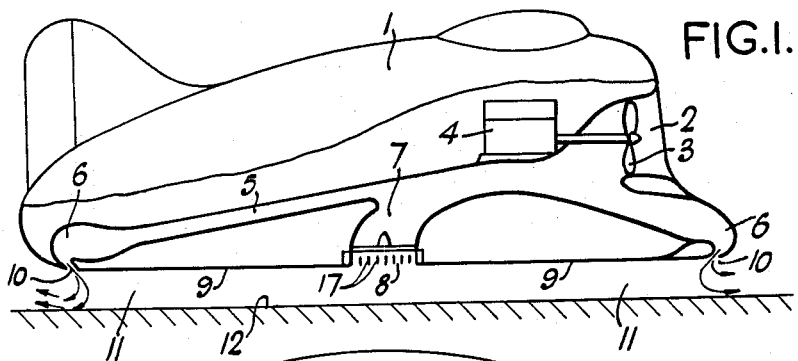
FIG.I.
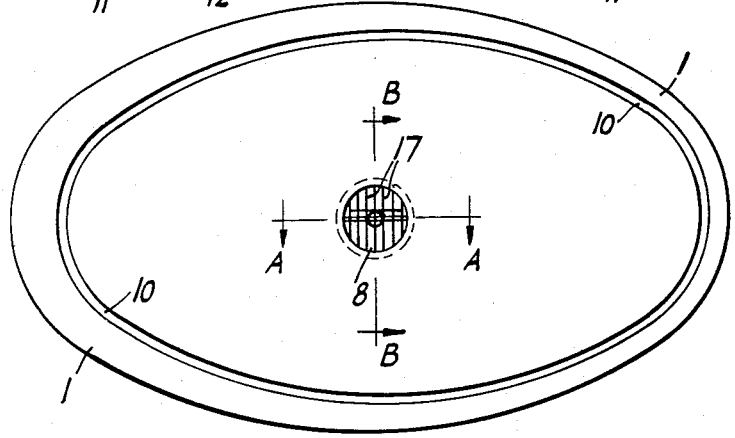
FIG.2.
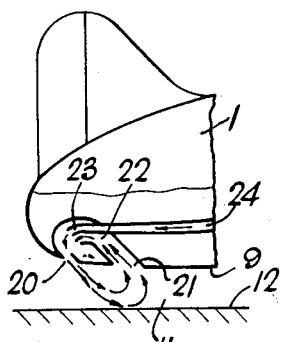
FIG.3.
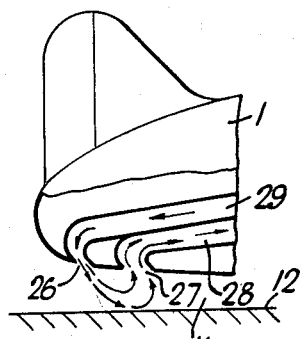
FIG.4.
Inventor
C. S. COCKERELL
By Cameron, Kerkam & Sutton
Attorneys Jan. 21, 1964     C. S. COCKERELL     3,118,513
GROUND EFFECT VEHICLE WITH INTEGRATED DIRECTIONAL
AND PROPULSIVE THRUST MEANS
Filed March 28, 1961     2 Sheets-Sheet 2

Inventor
C. S. COCKERELL
By Cameron, Kerkam & Sutton
Attorneys

United States Patent Office 3,118,513
Patented Jan. 21, 1964

3,118,513
GROUND EFFECT VEHICLE WITH INTEGRATED DIRECTIONAL AND PROPULSIVE THRUST MEANS
Christopher Sydney Cockerell, Lymington, England, assignor to Hovercraft Development Limited, London, England, a British company
Filed Mar. 28, 1961, Ser. No. 98,906
Claims priority, application Great Britain Apr. 1, 1960
3 Claims. (Cl. 180—7)

This invention relates to vehicles for travelling over and and/or water and may be applied to ships or aircraft or land-going vehicles or to vehicles which represent a combination thereof and which are of the type in which the vehicle is supported out of contact with a surface over which the vehicle is to travel or hover, by at least one cushion of pressurised fluid contained beneath the vehicle.

The vehicle may take the form in which the cushion of pressurised fluid is at least partly contained around its periphery by a curtain of fluid. In such a vehicle at least one curtain of fluid issues from at least one port in the bottom of the vehicle.

The same system of support is applicable to mobile platforms and the term vehicle as used herein is to be understood, where the context permits, as including a mobile platform.

An alternative form of vehicle is one in which the cushion of pressurised fluid is contained beneath the vehicle by means of a downward projecting wall or like member forming a plenum chamber. Fluid is pumped into the plenum chamber to form and maintain the cushion, excess fluid escaping beneath the bottom edge of the downward projecting member.

It has been proposed that the vehicle having fluid curtains, as described above, should be propelled at least in part by giving the jets of fluid forming the curtains an overall directional component, that is the resultant horizontal velocity component of the jets of fluid forming the curtains is arranged to be in the opposite direction to that in which the vehicle is to move. Similarly it has been proposed that by suitably varying the directional component of the curtain locally, the machine can be easily manoeuvred. Whilst propulsion of the vehicle by this method is readily achieved when simple forms of curtains are used, when compound curtain formations are used, then the above method of propulsion becomes more difficult to apply.

It has also been proposed to propel and manoeuvre vehicles of the alternative form, in which the cushion is contained in a plenum chamber, by ejecting jets of fluid from propulsion nozzles suitably positioned on the vehicle outside the plenum chamber.

According to this invention there is provided a vehicle for travelling over a surface and which is at least partly supported above that surface by a cushion of pressurised fluid formed and contained beneath the bottom of the vehicle, in which means are provided for creating a resultant horizontal thrust on the vehicle comprising means for expelling a fluid through at least one port formed in the bottom of the vehicle and opening into the space occupied by the cushion when in being, the said port being provided with means for varying the magnitude and direction of the horizontal component of the thrust produced by expulsion of the said fluid through the said port.

The means of creating a thrust according to the invention can also be used in conjunction with other means for producing propulsive and/or manoeuvering thrusts. Where the vehicle is supported by more than one cushion of fluid, the means of creating a thrust according to the invention may be applied to any or all of the cushion containing spaces.

Normally the fluid forming the cushion, and where provided the curtain, is a gas such as air or a mixture of air and exhaust gases. Other fluids such as steam or water can be used however, particularly for forming the curtains when the vehicle is operating over water. Even when the cushion is formed by air or other gas, a different fluid can be expelled from the port for providing a thrust. For convenience, however, hereinafter the fluid will be referred to as air.

Examples of typical forms of vehicles embodying the invention are described below in conjunction with the accompanying drawings in which:

FIGURE 1 is a sectional side elevation of a vehicle embodying the invention,

FIGURE 2 is an inverted plan view,

FIGURE 3 is a fragmental sectional view of a modification of the vehicle illustrated in FIGURES 1 and 2, FIGURE 4 is a further fragmental sectional view of an alternative modification of the vehicle illustrated in FIGURES 1 and 2.

Figure 5:
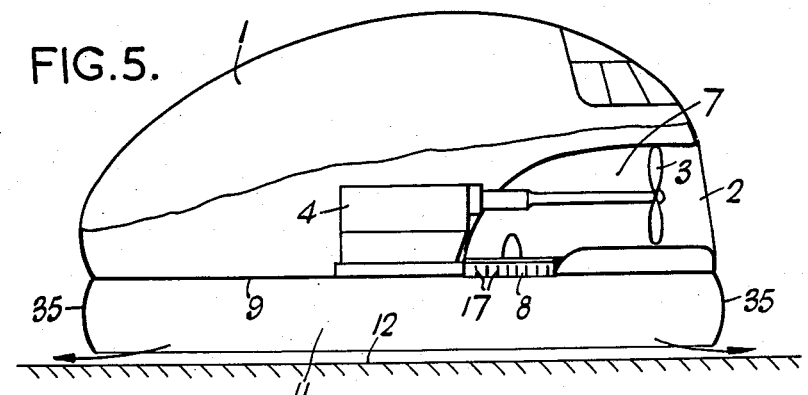
FIGURE 5 is a sectional elevation, similar to that of FIGURE 1, illustrating an alternative form of vehicle embodying the invention.

The vehicle illustrated in FIGURES 1 and 2 comprises a main body portion 1 having an air intake 2 through which is drawn air by a compressor 3 driven by a motor 4. The air from the compressor passes along ducts 5 to a supply duct 6 around the periphery of the vehicle. Air is also fed through a further duct 7 to a port 8 in the bottom surface 9 of the vehicle, the action of which is described below.

Formed in the bottom surface 9, of the vehicle and extending around the periphery thereof, is an annular port 10. The port 10 may be completely annular as seen in FIGURE 2 or may be in the form of separate slot shaped or similar ports arranged in an annular configuration.

In operation, air from the port 10 forms a curtain beneath the periphery of the vehicle. Air issues out of the port 10 flowing first downwards then curving outwards towards the atmosphere.

The curtain system, formed by the port 10 contains beneath the vehicle a cushion of pressurised air in the space 11, this space being bounded by the bottom 9 of the vehicle, the curtain system and the surface 12 over which the vehicle is travelling or hovering.

Figures 6, 7:
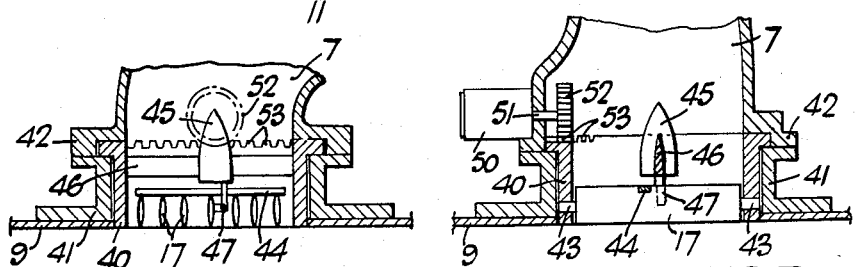
FIGURE 6 is an enlarged sectional view on the line A—A of FIGURE 2.
FIGURE 7 is a further enlarged sectional view on the line B—B of FIGURE 2.

The aforementioned port 8, which is circular in form, is positioned within the area occupied by the cushion. Air from the compressor 3 is fed to the port 8 by the duct 7. The port 8 is arranged to be rotatable and has mounted in it parallel vanes 17, the incidence of which may be varied. The construction of the port is more readily seen in FIGURES 6 and 7, and together with the operation thereof will be more fully described below.

The air curtain system of the vehicle illustrated in FIGURES 1 and 2 is of a simple form. The invention can also be applied to vehicles having a more complex curtain system, such as where at least part of the air forming the curtain is recovered and reused.

FIGURE 3 illustrates a modification of the vehicle of FIGURES 1 and 2, in which the air curtain is in the form of a vortex, energised by the injection of a relatively small amount of higher energy air. The air forming the curtain flows from the supply port 20, downwards and inwards and is then deflected upward to a recovery port 21. The recovery port is connected to the supply port by a transfer duct 22, the flow of air through this duct completing the vortex. A supply of air at an energy level higher than the curtain forming air, is injected into the transfer duct by means of injector nozzles 23. The higher energy air fed to the injector nozzles may be provided from any suitable source, such as, for example, the compressor 3 of FIGURE 1 via ducts 24. Alternatively a separate compressor may be provided.

A further form of air curtain system is illustrated in FIGURE 4. The air forming the curtain issues from a supply port 26 in a downwards and inwards direction. The air is then deflected upwards by the cushion into a recovery port 27. The air recovered through the recovery port is fed via a recovery duct 28 to a compressor, not shown, from which it is returned via a supply duct 29 to the supply port 26.

As stated above, the invention is applicable to vehicles in which the cushion of pressurised air is contained beneath the vehicle by means of a downward, projecting member. This is illustrated in FIGURE 5. Apart from the peripheral cushion containing means the vehicle illustrated is similar to that in FIGURE 1 and like references have been applied. Thus the vehicle comprises a main body portion 1 having an air intake 2 through which air is drawn by a compressor 3 driven by a motor 4. The air from the compressor 3, in the present example flows only through duct 7 to the port 8 in the bottom surface 9, of the vehicle.

Attached to the periphery of the bottom of the vehicle is a downward projecting member 35. This member can be of rigid construction, but is preferably of flexible material. If the member 35 is of rigid material, it can support the vehicle on the surface, where this is firm. On starting the compressor, air issues from the port 8 into the space 11 and forms a cushion of pressurised air. As soon as the pressure of the cushion is sufficient to provide enough lift to support the vehicle, the vehicle will rise slightly and excess air will then flow out beneath the bottom edge of the downward projecting member 35.

When the member 35 is of flexible material, either alternative means, such as downward projecting legs or wheels, must be provided to support the vehicle on a firm surface when the cushion is not in being, or the downward projecting member must be capable of folding upwards without damage. The downward projecting member, when of flexible material, is preferably preferred so that the pressure of the air cushion within the member acts to maintain the member in its fully downwardly extended position. The use of flexible material enables the member to deflect locally should it hit an obstruction.

When operating over water the downward projecting member will hang down into the water when the air cushion is not in being.

Turning now to the port 8, the construction and operation of this is as follows. The port has a hollow cylindrical member 40 rotatably mounted within a casing 41 rigidly attached to the bottom 9 of the vehicle, the duct 7 being attached to the top of casing by a flange 42 to give an air tight connection. The vanes 17 are mounted across the outlet formed by the inner member 40, being rotatably mounted by means of spigots 43 fitting into holes in the inner member and connected together by a cross-member 44 so that all the vanes move in unison. The vanes are mounted so that in their mid, or inoperative, position they are vertical presenting a zero angle of incidence to the air supplied from the duct 7. For causing movement of the vanes, an actuator 45, having a reciprocating action, is mounted in the centre of the port 8 by means of streamlined struts 46, being connected to the centre vane by linkage 47. The actuator, which may be of any suitable form for example electrical or hydraulic, is capable of movement either side of a central position, movement of the actuator moving the central vane, and thus all the vanes, to one side or the other of the mid position.

The inner member 40 is rotated within the casing 41 by a rotary actuator 50, mounted on the outside of the casing. The spindle 51 of the actuator passes through the casing and carries on its inner end a gear wheel 52 which engages with teeth 53 out on the top edge of the inner member. Rotation of the actuator 50 one way or the other will thus cause rotation of the inner member 40 in one direction or the other.

The operation is as follows:

After starting the compressor 3, with, in the case of the vehicles illustrated in FIGURES 1 to 4, the formation of the air curtains, the cushion of pressurised air is formed beneath the vehicle. The vanes 17 are initially set to their mid position and the air issuing from the port has only a vertical component of thrust. When the vehicle is fully operative, that is when the vehicle is supported over the surface by the cushion of pressurised air, then the air issuing from the port 8 is given a component of thrust which will move the vehicle in the required direction. For example, to propel the vehicle forward, the inner member 40 is positioned by means of the actuator 50 so that the longitudinal axis of the vanes is normal to the front to rear axis of the vehicle. The actuator 45 is then operated to incline the vanes 17 by rotating them on the spigots 43, so that the air issuing from the port has a rearward component of thrust, the vehicle being driven forward. The vehicle can be caused to move in any direction by suitable rotation of the inner member 40 and inclination of the vanes 17. Similarly, if there is a side effect on the vehicle due to a wind for example, this can be offset by suitable rotation of the inner member so as to provide a balancing component.

Once the vehicle is operative, the air issuing from the port 8 is excess to that required for the cushion. Thus, as described above in relation to FIGURE 5, the vehicle is maintained at a height such that the bottom edge of the downward projecting member is spaced from the surface over which the vehicle is operating by an amount sufficient to allow the escape of air equivalent to that issuing through the port. In a vehicle in which an air curtain is formed to at least partly contain the air cushion at its periphery, as in FIGURES 1 to 4, a similar effect occurs. Once the air has formed and the cushion is in being, any air issuing from the port 8 will escape to the surrounding atmosphere beneath the air curtain.

Whilst in the embodiment illustrated in FIGURES 1 to 4, the air supply to the port 8 is shown as originating from the same source as that for the curtain forming means, a separate air supply for the port can be provided.

Figure 8:
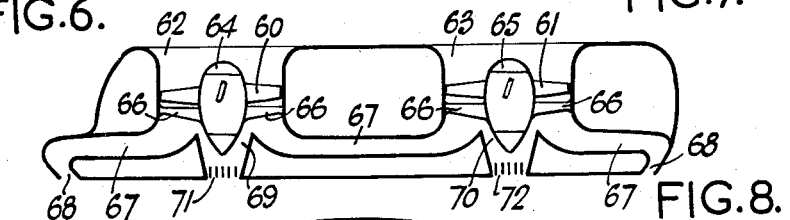
FIGURE 8 is a sectional side elevation of a further form of vehicle embodying the invention.
Figure 9:
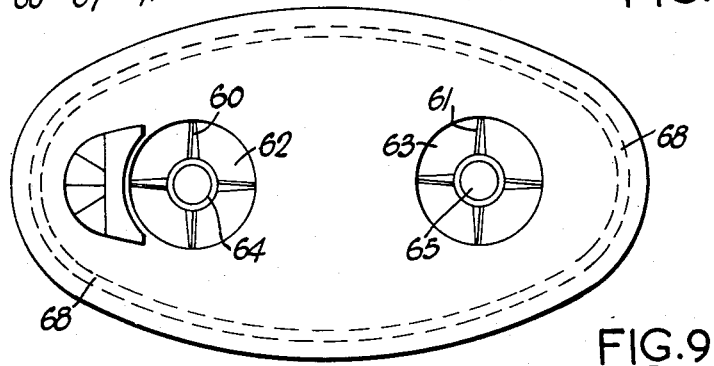
FIGURE 9 is a plan view of the vehicle illustrated in FIGURE 8.

The provision of more than one port in the bottom of the vehicle enables a turning moment to be applied to the vehicle by suitable variation of the rotational position of the inner members, the inclination of the vanes and the mass flow through the ports or by various combinations of such variations. A typical vehicle having two ports is illustrated diagrammatically in FIGURES 8 and 9, the vehicle having two propellers 60 and 61 mounted in intakes 62 and 63. The propellers are driven by engines 64 and 65 supported from the main structure by struts 66 which may also act as stator vanes for straightening the air flow. In operation air is drawn in through the intakes and expelled into a duct 67 by the propellers. The air flows through the duct and is expelled from an annular supply port 68 to form a curtain of air. A cushion of pressurised air is formed and maintained beneath the vehicle by the curtain of air. Some of the air from each intake flows through two annular ports 69 and 70 one round the casing of each engine. The air passing through the annular ports 69 and 70 flows to ports 71 and 72 respectively, formed in the bottom of the vehicle. Each of the ports 71 and 72 is provided with a rotatable member and variable incidence vanes as described above. By relative rotation of the rotatable members and/or variable incidence vanes, with or without variation of the mass flow through the ports 71 and 72, various directional moments and forces can be applied to the vehicle.

To improve the stability of vehicles, the cushion area can be subdivided, either by structural members, preferably flexible, or by air curtains. Alternatively or in addition, an annular or part annular secondary cushion may be formed outside the main cushion.

Normal means of propulsion, such as air propellers, can be provided, the air issuing through the ports 8 providing additional propulsion, or any manoeuvering thrusts.

I claim:

1. A vehicle for travelling over a surface which is at least partly supported above that surface by a cushion of pressurised air comprising a body, means for peripherally enclosing a space beneath said body wherein a cushion of presssurised air is formed when the vehicle is in operation, an air intake in said body, a port in bottom of said body communicating with the space occupied by said air cushion, a duct connecting said port and said intake, means for drawing air into said duct through said intake and expelling said air downwardly through said port into said space so as to exert a thrust on the vehicle, a plurality of parallel vanes carried by a member rotatably mounted in said port, said vanes being pivotally mounted on said member for simultaneous movement about axes lying in a common horizontal plane to vary the vertical deflection of the flow of air expelled through said port, and means for rotating said member and vanes as a whole relative to said port to vary the horizontal deflection of said flow of air, whereby the magnitude and direction of the horizontal thrust produced by said flow of air may be varied without varying the attitude of the vehicle.

2. A vehicle as defined in claim 1 wherein the means for peripherally enclosing a space beneath the vehicle body wherein a cushion of pressurised air is formed when the vehicle is in operation includes means for forming a curtain of moving fluid travelling downwardly from the bottom surface of the vehicle, which curtain in combination with the structure of the vehicle and the surface over which the vehicle is operating effectively encloses said space and contains said cushion for at least a portion of the periphery of said space.

3. A vehicle as defined in claim 1 wherein the means for peripherally enclosing a space beneath the vehicle body wherein a cushion of pressurised air is formed when the vehicle is in operation includes means for forming a curtain of moving fluid travelling downwardly from the bottom surface of the vehicle, which curtain in combination with the structure of the vehicle and the surface over which the vehicle is operating effectively encloses said space and contains said cushion for the whole of the periphery of said space.

References Cited in the file of this patent

UNITED STATES PATENTS

| | | |
|---|---|---|
| 1,800,794 | Hartman | Apr. 14, 1931 |
| 2,838,257 | Wibault | June 10, 1958 |
| 2,939,649 | Shaw | June 7, 1960 |
| 2,955,780 | Hulbert | Oct. 11, 1960 |
| 2,968,453 | Bright | Jan. 17, 1961 |
| 3,050,146 | Crim | Aug. 21, 1962 |

OTHER REFERENCES

Publication: "Symposium on Ground Effect Phenomena," Oct. 21–23, 1959, pages 96 and 391.